United States Patent
Berson

(10) Patent No.: US 6,652,893 B2
(45) Date of Patent: Nov. 25, 2003

(54) MACHINE AND PROCESS FOR AERATING AND FLAVORING WATER

(76) Inventor: William Berson, 9 Huckleberry La., Weston, CT (US) 06883

(*) Notice: Subject to any disclaimer, the term of this patent is extended or adjusted under 35 U.S.C. 154(b) by 276 days.

(21) Appl. No.: 09/901,504

(22) Filed: Jul. 9, 2001

(65) Prior Publication Data

US 2003/0012849 A1 Jan. 16, 2003

(51) Int. Cl.[7] .............................. A23L 2/56; B01D 19/00
(52) U.S. Cl. .................... 426/67; 426/474; 426/475; 426/487; 261/29; 261/74; 261/119.1
(58) Field of Search ...................... 426/67, 474, 475, 426/487, 590; 95/263; 261/29, 74, 119.1

(56) References Cited

U.S. PATENT DOCUMENTS

| | | |
|---|---|---|
| 3,894,555 A | 7/1975 | Payne |
| 4,019,072 A | 4/1977 | Mifune |
| 4,342,710 A | 8/1982 | Adolfsson |
| 4,440,318 A | 4/1984 | Berger |
| 4,526,692 A | 7/1985 | Yohe |
| 4,608,163 A | 8/1986 | Yohe |
| 4,850,269 A * | 7/1989 | Hancock et al. ............ 99/323.1 |
| 4,943,305 A | 7/1990 | Bernhardt |
| 4,947,739 A | 8/1990 | Owen |
| 4,979,886 A | 12/1990 | Rippberger |
| 5,018,576 A | 5/1991 | Udell |
| 5,045,215 A | 9/1991 | Lamarre |
| 5,069,796 A | 12/1991 | Fox |
| 5,104,554 A | 4/1992 | Dempsey |
| 5,162,037 A | 11/1992 | Whitson-Fischman |
| 5,240,595 A | 8/1993 | Lamarre |
| 5,352,276 A | 10/1994 | Rentschier |
| 5,354,459 A | 10/1994 | Smith |
| 5,378,267 A | 1/1995 | Bros |
| RE35,074 E | 10/1995 | Lamarre |
| 5,525,237 A | 6/1996 | Birbara |
| 5,603,915 A | 2/1997 | Nelson |
| 5,660,721 A | 8/1997 | Kyriss |
| 5,685,976 A | 11/1997 | Lamarre |
| 5,744,040 A | 4/1998 | Slates |
| 6,130,108 A | 8/2000 | Kohlenberg |
| 6,162,360 A * | 12/2000 | Ho et al. ...................... 210/651 |
| 6,251,167 B1 * | 6/2001 | Berson ......................... 95/263 |
| 6,270,059 B1 * | 8/2001 | Kurzer et al. .................. 261/29 |
| 6,355,292 B1 * | 3/2002 | Cheng et al. ................ 426/477 |
| 6,419,829 B2 * | 7/2002 | Ho et al. ...................... 210/644 |

* cited by examiner

Primary Examiner—Nina Bhat
(74) Attorney, Agent, or Firm—John V. Stewart

(57) ABSTRACT

An enclosed tank with a water inlet, a water outlet, an air inlet, and an air outlet. A flavor additive cartridge is attached in-line with the air inlet. It evaporates flavoring or other additives into the air inlet. Water is forced to flow turbulently through the tank. Simultaneously air is pumped through the tank via the additive cartridge. Turbulence induced in the water encourages pollutant gases dissolved in the water to transfer to the pumped air and then to exit the air outlet. It also encourages flavoring and/or homeopathic medicine in the additive cartridge to dissolve from the pumped air into the water. Water pressure is provided externally to the invention, such as by a water utility or house water pump. The water level in the tank is stabilized by controlling the air pressure in the tank, via various alternative means.

8 Claims, 4 Drawing Sheets

MACHINE AND PROCESS FOR AERATING AND FLAVORING WATER

BACKGROUND OF THE INVENTION

1. Field of the Invention

This invention relates generally to the field of beverages and more particularly to a machine and method for aerating and flavoring water.

2. Description of Prior Art

Tap water may contain unwanted dissolved gases such as hydrogen sulfide, which impart an unpleasant taste, making otherwise palatable water disagreeable to drink. Various filtering devices using activated charcoal or other forms of carbon, either in block form, granular form, or as paper impregnated with carbon, have been developed to filter tap water in the home and improve its taste. Filtering uses media such as activated charcoal, which adsorbs the unwanted contaminants.

The treatment of water supplies using aeration is well known and is used in large-scale plants to improve water supply quality. Aeration serves to liberate dissolved gases, especially higher vapor-pressure hydrocarbons and hydrogen sulfide, and promotes the growth and activity of aerobic bacteria.

Flavored beverages such as sodas and waters are made by adding flavored syrups to still or carbonated waters. Syrups normally add calories and substances such as colorants, artificial sweeteners, preservatives, and salt. These beverages may be made on demand in food service establishments or bottled in a factory.

Examples of the prior art are found in the following U.S. patents:

| | |
|---|---|
| US3565405 | Turbulent Flow Carbonator |
| US3627444 | Machine For The Production of Aerated Beverages From Prefabricated Cartridges Containing Flavoring Substances |
| US3664372 | Fluid Mixing Device |
| US3723851 | Beverage Mixer and Dispenser |
| US3784008 | Ozonating Apparatus for Drinking Water |
| US4342710 | Apparatus for Aerating Beverages |
| US4582610 | Well Water Aeration System |
| US4695379 | Water Treatment Apparatus |
| US4947739 | Home Soda Dispensing System |
| US4440318 | Beverage Dispenser |
| US5162037 | Magnetically Influenced Homeophatic Pharmaceutical Formulations, Methods of Their Preparation and Methods of Their Administration |
| US5354459 | Apparatus and Method for Removing Odorous Sulfur Compounds from Potable Water |
| US5603915 | Process for Manufacturing Homeopathic Medicines |

Shortcomings of the prior art devices include large size, complexity, and cost. Another shortcoming of the prior art is its inability to flavor water without the use of syrups. An additional shortcoming of the prior art is the inability to simultaneously remove undesirable dissolved gases while adding flavor. Yet another shortcoming in the prior art is its inability to produce homeopathically treated water in the home continuously and on-demand, as opposed to a small batch process.

SUMMARY OF THE INVENTION

The primary object of the invention is the creation of flavored still water. Another object of the invention is the improvement of the taste of potable water by removal of hydrogen sulfide and other dissolved gases. A further object of the invention is flavoring of water with an in-line on-demand device. Yet another object of the invention is flavoring of water without the introduction of syrups. Another object is provision of a small, inexpensive water flavoring system that can be implemented in household and food service applications. Another object is the creation of homeopathically treated water on demand.

These objectives are achieved in a device with an enclosed tank having a water inlet, a water outlet, an air inlet with an air supply line, and an air outlet. A flavor additive cartridge is attached to the air supply line. It evaporates flavoring or other additives into the airflow. Water is forced to flow turbulently through the tank. Simultaneously air is pumped through the tank via the additive cartridge. Turbulence in the water encourages pollutant gases dissolved in the water to transfer to the pumped air and thence to exit the air outlet. Turbulence also encourages flavoring and/or homeopathic medicine to dissolve from the pumped air into the water. Water pressure is provided externally to the invention, such as by a water utility or house water pump. The water inlet has a nozzle that injects the water against baffles in the tank to create turbulence. The water level in the tank is stabilized by controlling the air pressure in the tank. A lower layer of water and an upper layer or head of air are maintained at all times in the tank as they flow through the tank together. Various water level stabilizing means are shown as examples.

Figure 1:
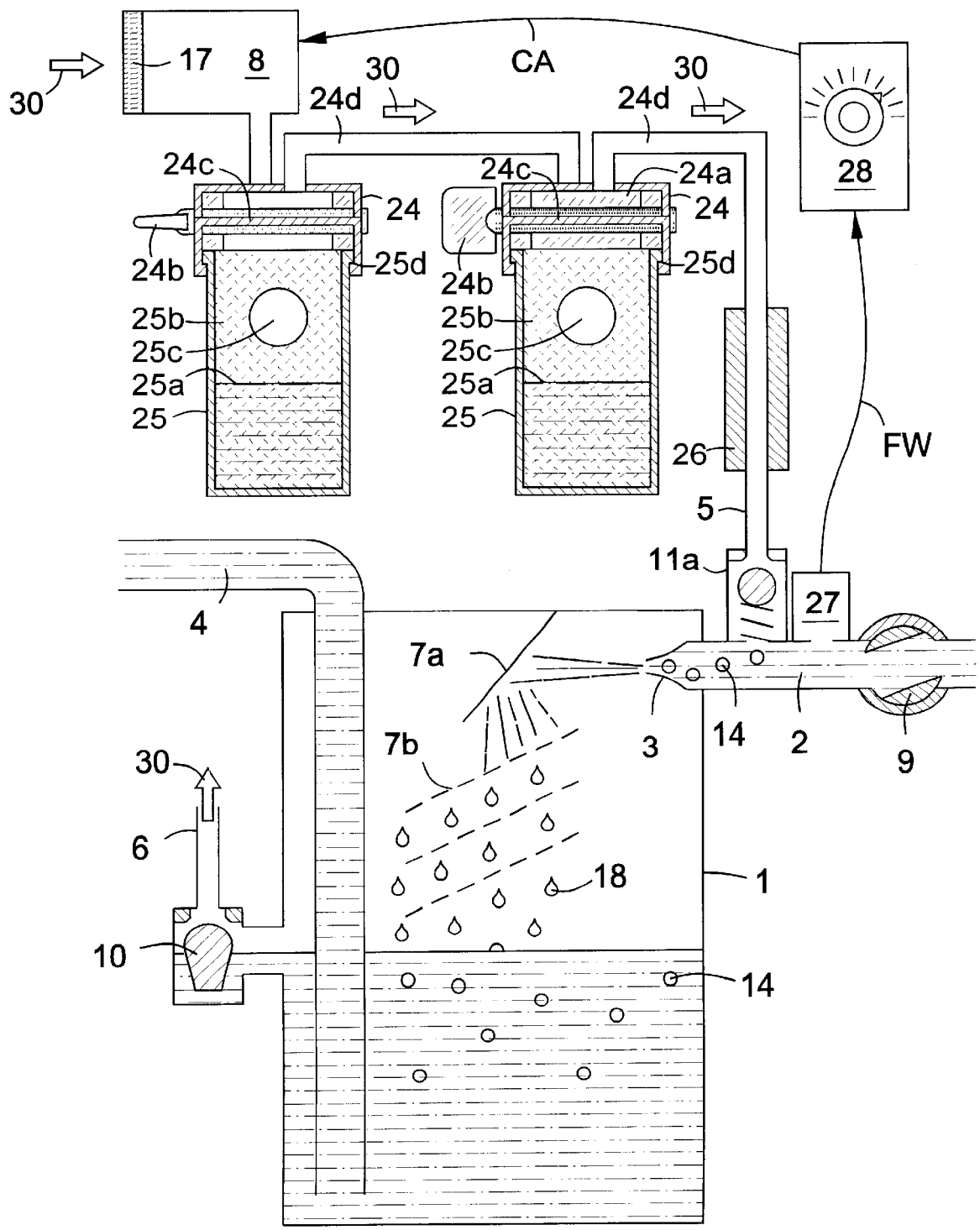
FIG. 1 is a schematic view of an example of the invention with a flow of scrubbing air, stabilization of the water level by a float valve on the scrubbing air outlet, and a demand valve on the water inlet.
Figure 2:
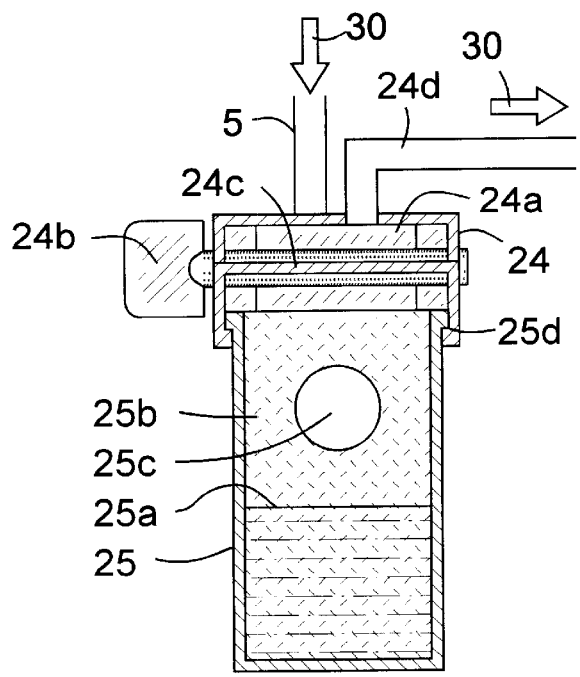
FIG. 2 is a front stylized sectional view of an example flavoring cartridge with an air control valve in the full flavoring position, taken on a vertical section through the flavor cartridge air outlet, forward of the wick.
Figure 3:
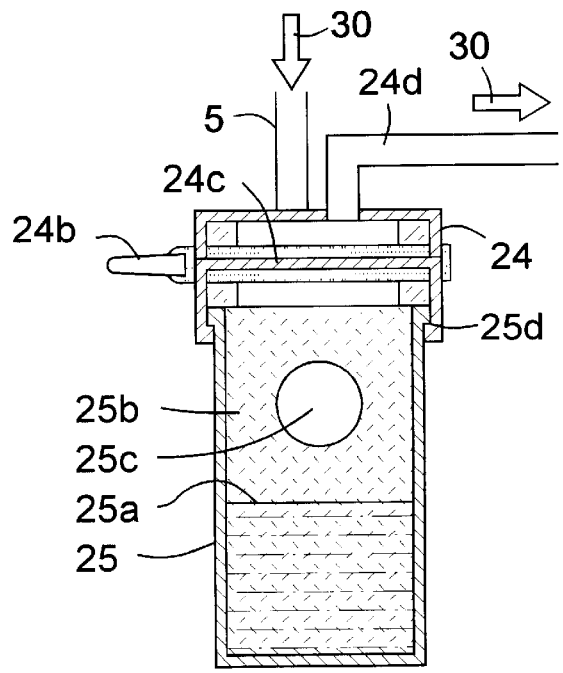
FIG. 3 is a view as in FIG. 2 with the air control valve in the full bypass position.
Figure 4:
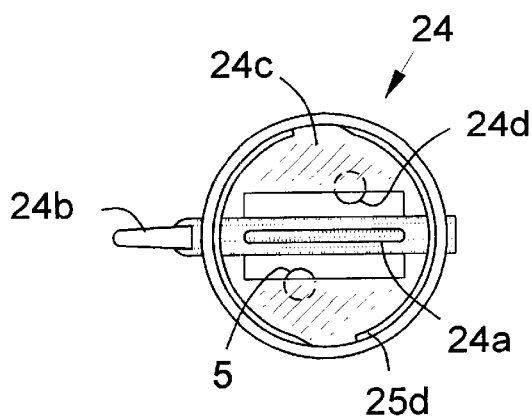
FIG. 4 is a bottom view of only the receiver cap and flavor control valve of FIG. 2.
Figure 5:
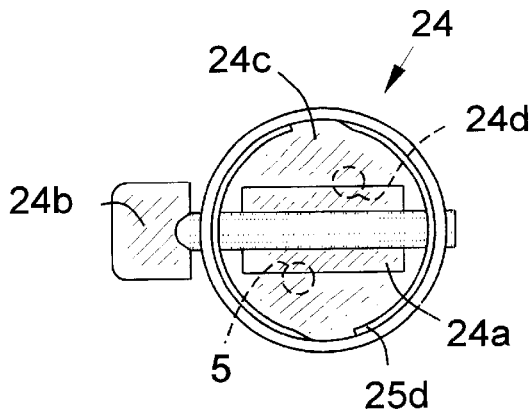
FIG. 5 is a bottom view of only the receiver cap and flavor control valve of FIG. 3.

| REFERENCE CHARACTERS |
|---|
| 1. Tank |
| 2. Water inlet |
| 3. Water inlet nozzle |
| 4. Water outlet |
| 5. Scrubbing air inlet |
| 6. Scrubbing air outlet |
| 7a. First baffle |
| 7b. Percolation baffle or baffles |
| 8. Scrubbing air pump |

-continued

REFERENCE CHARACTERS

9. Water flow rate and shut-off valve (demand valve)
10. Float valve
11a. Scrubbing air check valve
11b. Water inlet check valve
12. Electronic selector/controller
13. Scrubbing air pressure relief valve
13a. Scrubbing air pressure relief valve adjustment
14. Scrubbing air bubbles
15. Gas permeable membrane
16. Membrane support frame
17. Air Filter
18. Water drops
19. Water level sensor
20. Water contamination sensor
21. Water pressure sensor
22. Scrubbing air pressure sensor
23. Scrubbing air vent valve
24. Flavor cartridge receiver
24a. Flavor cartridge control baffle
24b. Flavor cartridge bypass baffle control knob
24c. Flavor cartridge bypass baffle
24d. Flavor cartridge air outlet
24e. Flavor cartridge control baffle servo
25. Flavor additive cartridge
25a. Flavor additive
25b. Flavor wick
25c. Air passage in wick
25d. Threaded interlock
26. Magnet
27. Water inlet flow rate sensor
28. Air pump time proportion controller
29. Cartridge selector knob
30. Scrubbing air flow
PW Water pressure signal
FW Water flow signal
PA Scrubbing air pressure signal
CA Air pump control signal
CB Baffle control signal
VA Air vent valve control signal
CO Water contamination signal

DETAILED DESCRIPTION

FIG. 1 shows an example of the invention having a tank 1 with a water inlet 2, a water outlet 4, a scrubbing air inlet 5, and a scrubbing air outlet 6. Water to be cleared of dissolved gases and flavored, enters the tank through an inlet nozzle 3 under pressure provided externally to the invention. The inlet nozzle sprays the water against a first baffle 7a, which redirects and splatters the water onto one or more additional baffles 7b. Preferably the first baffle 7a is solid, and the additional baffles 7b are perforated and/or corrugated and/or dimpled to maximize their surface area, causing the water to percolate with maximum surface and time exposure to the scrubbing air. The flow of water is controlled by a demand valve 9 on the water inlet. This valve can be of any conventional type.

One or more flavor cartridges 25 are arranged in series with the air inlet 5. A flavor cartridge contains active ingredients such as aromatic flavorings or homeopathic remedies dissolved in an evaporating carrier vehicle. Examples of such ingredients are oil of vanilla and oil of cloves. Examples of the carrier vehicle materials are ethyl alcohol, water, or non-toxic hydrocarbon liquids. The active ingredients are contained in a dispersal medium which releases them through evaporation at a predetermined rate into the inlet air stream. An example of such a medium would be a sponge, compressed glass wool or a sublimating wax. In operation, air is pumped through the cartridge and thence through the tank. Sufficient scrubbing and flavoring capacity can be achieved with an inexpensive aeration pump like those used in home aquariums. This pump must produce a higher maximum air pressure than the pressure of the water at the water inlet.

An example of a flavor cartridge 25 is shown in FIGS. 2–5. Preferably a transparent cylindrical jar with a threaded lip 25d is used. A threaded receiver cap 24 is provided on the air inlet line 5. The cartridge threadedly interlocks with the receiver in less than half a turn to a stop. A gasket or O-ring preferably seals the interlock. A liquid evaporative flavoring medium 25a in the jar has a wick 25b. The wick is a fibrous plate that crosses the jar interior diametrically, dividing the interior of the jar into two halves. A hole 25c is provided in the wick for air to pass between the halves. The receiver cap has an air flavor bypass baffle 24a with a manual control twist knob 24b. The bypass baffle has a full flavoring position (FIGS. 2 and 4) that directs all the inlet air 12 to travel through the hole in the wick. The bypass baffle has a full bypass position (FIGS. 3 and 5) that directs all the inlet air 12 to bypass the wick. The bypass baffle is variable between these two positions. This gives the user full control of the percentage of pumped air passing through the wick. The thread interlock stop causes the wick to stop in alignment with the bypass baffle 24a, so the bypass baffle seals against the wick in the full flavor position. This is just one example of possible flavor cartridge and bypass baffle designs.

The embodiment of FIG. 1, has two flavor cartridges, both with manually controlled flavor control valves 24a, 24b. These valves can both be in any position between fully closed and fully open, allowing the user to mix flavors and control their intensity. Other embodiments, such as in FIG. 7, can optionally provide electronic control of the flavor control valves.

Preferably, an adjustable air pump controller 28 is provided with input from a flow rate sensor 27 on the water inlet. The controller activates the air pump 8 continuously only when water is flowing into the tank, and periodically when water is not flowing. This avoids wasting the flavoring and over-dosing the water. The controller has a timer that operates the air pump a selected proportion of the time when water is not flowing. The time proportion of air pump operation time can be controlled by a single control as shown. For example, every 4 hours the air pump might operate for a period ranging from OFF=0 minutes to MAX= 30 minutes. Thus, whether the unit is used heavily or sparingly, a substantially saturated level of flavoring vapor is maintained in the tank.

Although the flow sensor 27, the adjustable controller 28, and the air pump 8 are shown as separate units, they can be combined in various ways. For example, the controller could be integrated with the air pump, the flow sensor, or both.

Receivers for one or more flavor cartridges can be provided. The product designer may choose to provide a manifold for multiple flavor cartridges with a selector switch that chooses only one at a time. In addition to the selector switch a variable bypass valve may be provided for the manifold as a whole, similarly to the valve 24c as shown for the individual receivers, to control the intensity of flavoring.

In FIG. 1, the level of water in the tank is maintained by the pressure of the scrubbing air via a float valve 10 on the scrubbing air outlet 6. When a user opens the demand valve 9, water flows into the tank, raising the water level in the tank, and causing the float valve to rise, which closes the scrubbing air outlet. When water flows, a water flow sensor 27 on the water inlet 2 activates an air pump 8 via a controller 28. Alternately, the water flow sensor 27 can be part of the float valve 10, and can comprise a switch activated by the float rising in the float valve. Air is pumped into the tank at a higher pressure than the water. It is variably vented by the float valve at a rate generally inversely proportional to the water level, thus stabilizing the water level about the desired level as water exits the water outlet 5. When the water surface lowers, the float valve proportionally opens the air outlet, and when the water surface rises, the float valve proportionally closes the air outlet. The continuously variable reaction of the float valve keeps the water level stable in the tank, and keeps the pressure of the air in equilibrium with the pressure of the water.

When the incoming water contains dissolved gases imparting a disagreeable taste, such as hydrogen sulfide, the air outlet 6 may be ducted to the outside air. A check valve 11a prevents back-flow of water into the air pump. The device of FIG. 1 is appropriate for kitchen countertop use in which a single demand valve operates the unit.

Figure 6:
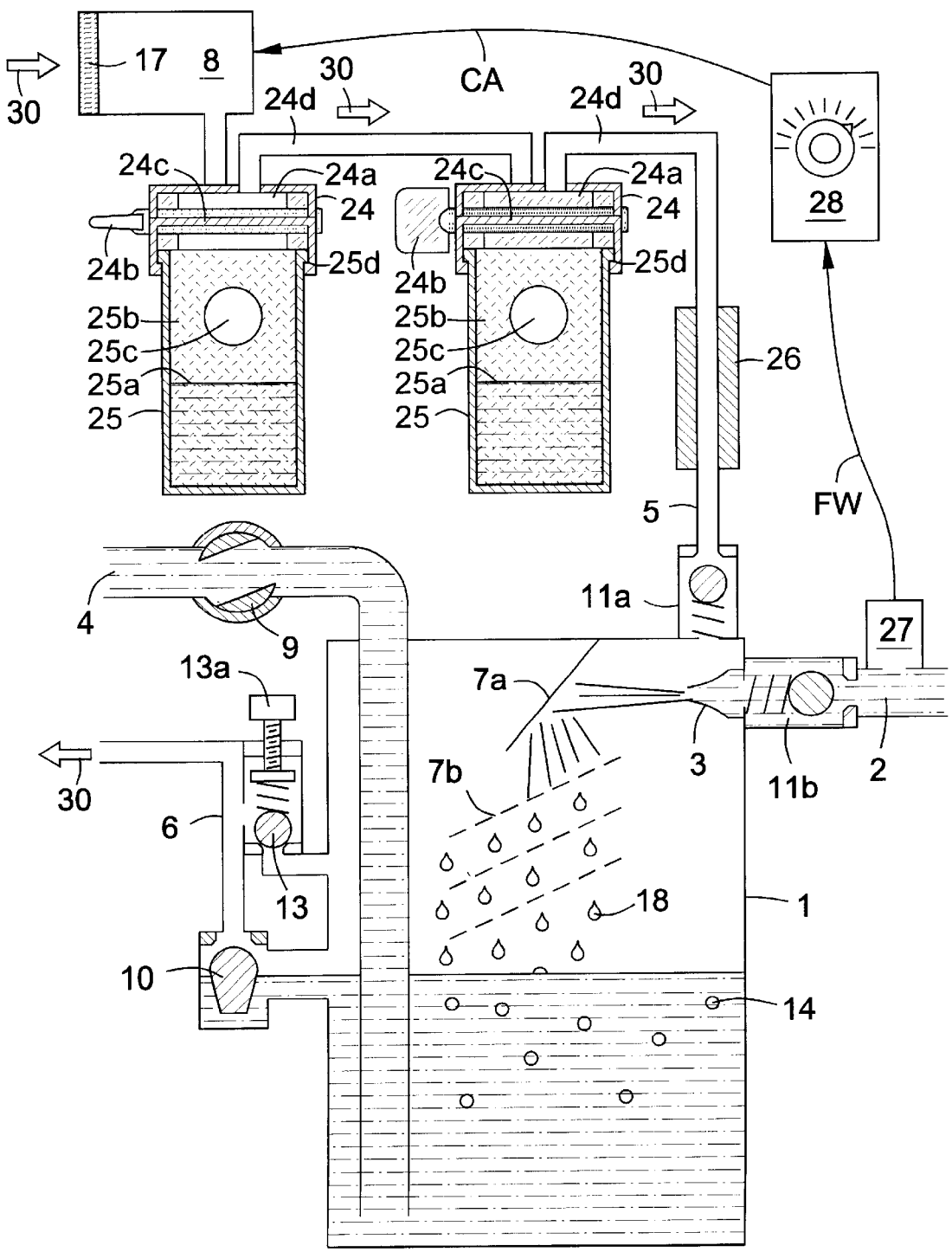
FIG. 6 is a schematic view similar to FIG. 1, except the demand valve is on the water outlet, and with the addition of a water inlet check valve and a scrubbing air pressure relief valve.

FIG. 6 shows an embodiment with the liquid flow controlled by one or more demand valves 9 on one or more the liquid outlets. In this embodiment, it is possible that after the demand valve is closed the water temperature may rise enough to expand the water and partially or fully close the float valve. This would slow or stop the air circulation, and could cause the air pressure to increase enough to force air into the water inlet. To prevent this, a check valve 11b is provided on the water inlet, and an air pressure relief valve 13 is provided on the upper part of the tank. When the air pressure exceeds the water inlet pressure, the water check valve 11b closes, preventing back-flow of air into the water inlet. At a given air pressure above the water inlet pressure, the air pressure relief valve opens, allowing the air to continue to circulate, providing scrubbing and flavoring. The relief valve can have a fixed set-point that is higher than the known water inlet pressure. However, preferably the relief valve set-point is adjustable as shown, so it can be set according to the inlet pressure of the water. Alternately, the relief valve can have an automatic set-point operated by a diaphragm and linkage influenced by water communication with the water inlet.

Figure 7:
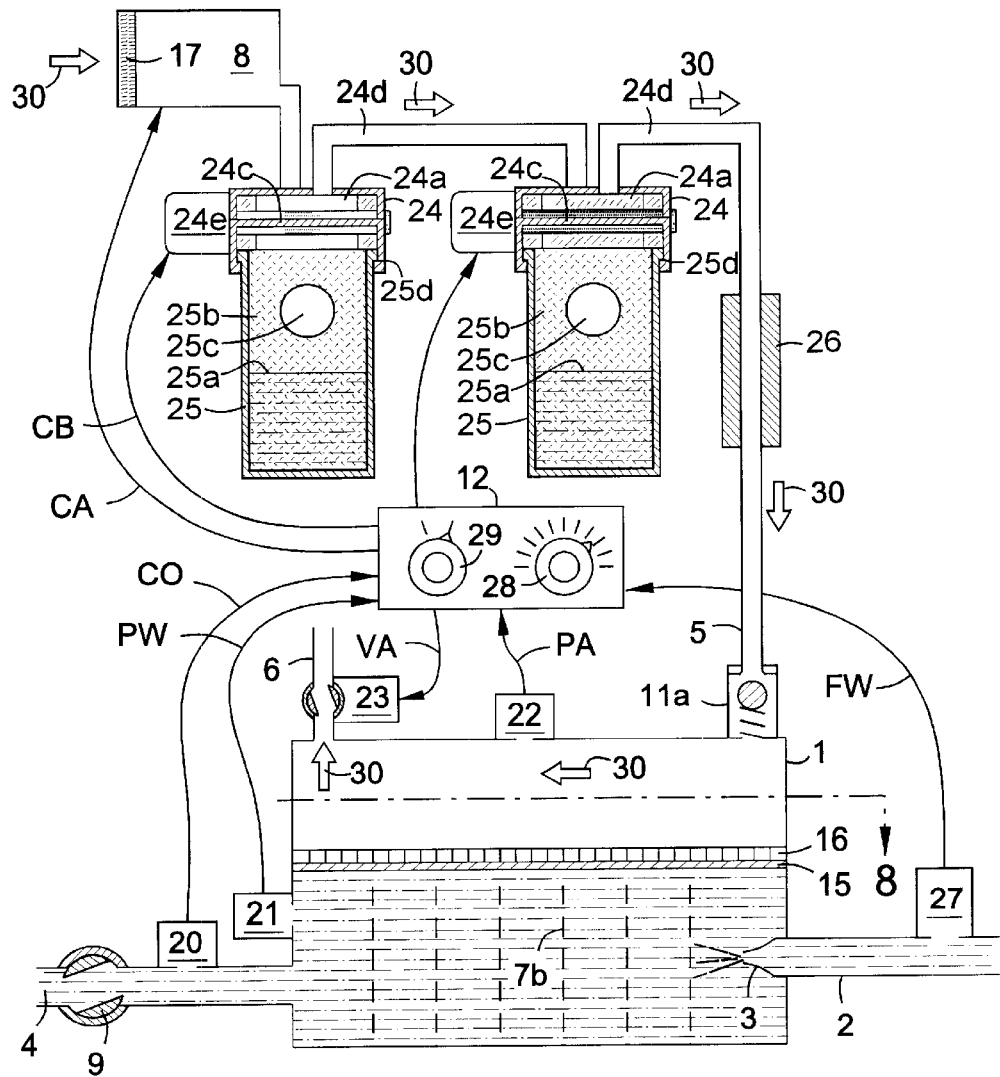
FIG. 7 is a schematic view of a third embodiment, with an air-permeable membrane 14.
Figure 8:
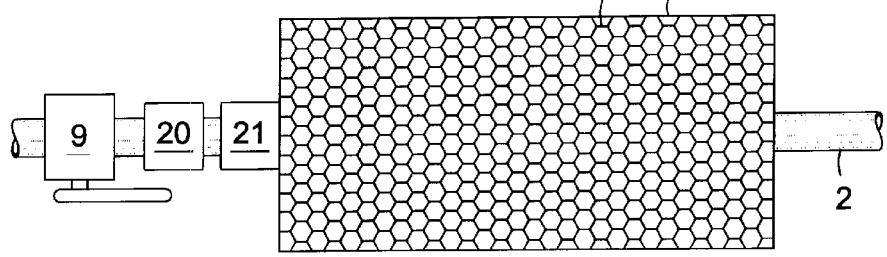
FIG. 8 is a sectional view taken along line 8 of FIG. 7.

FIGS. 7 and 8 show an electronically controlled embodiment. Servo motors 24e control each bypass baffle in the flavor cartridges. An electronic selector/controller 12 includes a cartridge selection control knob 29 that controls the bypass baffles 24c to introduce flavoring from a selected cartridge. A variable air pumping proportion control 28 is included, and operates as previously described.

In FIGS. 7 and 8 the water level in the tank 1 is maintained partly by electronic control of the air pressure, and partly by a membrane 15 that acts as a lid on the water. The membrane is gas permeable, and allows the dissolved gases to pass through it into the scrubbing air. The water inlet nozzle 3 enters the tank below the surface of the water, and sprays the water against perforated submerged baffles 7b to induce turbulence. A frame 16 forms a grid over the membrane, and supports it against upward pressure from the water. The scrubbing air is controlled to have slightly less pressure in the tank than the water in the tank, making the membrane the upper limit of the water level. The water and scrubbing air pressures in the tank are provided to the controller 12 by sensors PW and PA respectively. The controller operates the vent valve VA and air pump 8 to control the scrubbing air pressure in the tank. If a contamination sensor CO is provided as shown, the controller sets the pump rate and/or the pumping time proportion of the scrubbing air according to the contamination level detected, and the reduction desired.

A magnet 26 may be mounted on the air inlet tube between the flavor cartridge and the tank as in FIG. 1 to magnetically influence the flavored water or homeopathic vapor. A magnet may alternately or additionally be placed on the water outlet line for the same purpose.

Various forms of turbulence induction can be used. For example, the nozzle 3 can spray the water across the scrubbing air layer from one side of the tank to the other without baffles. Alternately, the nozzle can spray upward from the just above the surface of the water toward the top of the tank for a round trip up and down through the air. However, the preferred embodiments are shown.

Although the invention herein has been described with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention.

I claim:

1. A process for reducing undesirable dissolved gasses in a liquid and adding desirable gasses to the liquid, comprising the steps of:

providing a hollow tank with a liquid inlet, a liquid outlet, a scrubbing gas inlet, a scrubbing gas outlet, and a desired liquid level in the tank;

connecting a source of liquid to the liquid inlet, the liquid having a given pressure;

providing a scrubbing gas supply line supplying a flow of scrubbing gas to the scrubbing gas inlet, the scrubbing gas having a pressure higher than said given pressure;

providing a canister on the scrubbing gas supply line, the canister containing at least one desirable additive for the liquid, the additive in a form that vaporizes into the scrubbing gas;

providing a scrubbing gas flow valve on the scrubbing gas outlet that releases scrubbing gas from the tank at a variable rate; and, stabilizing the liquid level in the tank around the desired liquid level by variably venting scrubbing gas from the tank via the scrubbing gas flow valve, without controlling a liquid pump;

whereby the process reduces undesirable dissolved gasses in a liquid in the tank, and adds desirable gasses to the liquid, without the need to control a liquid pump.

2. A machine for reducing undesirable dissolved gasses in a liquid and adding desirable gasses to the liquid, comprising:

a tank with a liquid inlet, a scrubbing gas inlet, and a scrubbing gas outlet;

a liquid in the tank at a desired liquid level;

a scrubbing gas in a headspace in the tank above the desired liquid level;

a scrubbing gas supply line connected to the scrubbing gas inlet;

a spray nozzle on the liquid inlet for injecting the liquid turbulently into the tank;

a scrubbing gas pump connected to the scrubbing gas supply line for pumping the scrubbing gas into and through the tank;

a canister on the scrubbing gas supply line, the canister containing at least one desirable additive for the liquid in a form that vaporizes into the scrubbing gas and then dissolves from the scrubbing gas into the liquid; and, stabilization means for maintaining the desired liquid level in the tank without controlling a liquid pump;

whereby the machine can be attached to plumbing without electrical connections to a liquid pump, provides reduction of undesirable dissolved gasses in a liquid, and adds desirable gasses to the liquid.

3. The machine of claim 2, further comprising:

a flow rate sensor on the liquid inlet; and a scrubbing gas pump controller electrically connected to the scrubbing gas pump and to the flow rate sensor, that activates the scrubbing gas pump continuously when the sensor detects a flow of liquid, and activates the scrubbing gas pump at timed intervals when the flow rate sensor does not detect a flow of liquid;

whereby an approximately constant charge of said at least one desirable additive is maintained as a vapor in the scrubbing gas in the tank.

4. The machine of claim 2, further comprising;

a receiver on the scrubbing gas supply line for removable attachment of the canister to the scrubbing gas supply line; and a movable baffle in the receiver that directs the scrubbing gas to pass through the canister or bypass the canister in adjustable proportion.

5. The machine of claim 2, wherein the scrubbing gas outlet is at the desired level of liquid in the tank, and further comprising:

a float valve on the scrubbing gas outlet that releases the scrubbing gas from the tank in inverse proportion to the liquid level in the tank when the liquid level in the tank is at or below the desired liquid level;

a demand valve on the liquid inlet;

no demand valve on the liquid outlet; and the liquid outlet comprises a fluid communication channel with an inlet end inside the tank below the desired liquid level, and an outlet end outside the tank above the desired liquid level;

whereby the machine can be attached to household plumbing without electrical connections to a water pump, and provides reduction of dissolved gasses from, and addition of said at least one desirable additive to, a household water supply.

6. The machine of claim 2, wherein the scrubbing gas outlet is at the desired level of liquid in the tank, and further comprising:

a float valve on the scrubbing gas outlet that releases the scrubbing gas from the tank in inverse proportion to the liquid level in the tank when the liquid level in the tank is at or below the desired liquid level;

a second scrubbing gas outlet in the tank above the desired liquid level that releases the scrubbing gas from the tank in proportion to the pressure of the scrubbing gas in the tank when the liquid level in the tank is above the desired liquid level; and at least one demand valve on the liquid outlet;

whereby the machine can be attached to household plumbing without electrical connections to a water pump, and provides reduction of dissolved gasses from, and addition of said at least one desirable additive to, a household water supply.

7. The machine of claim 2, further comprising:

at least one demand valve on the liquid outlet;

a semi-permeable membrane horizontally sealed across the interior of the tank at the desired liquid level;

the liquid inlet below the level of the membrane;

an electronic logic circuit having electronic inputs and outputs;

a headspace gas pressure sensor on the tank providing a first input to the logic circuit;

a liquid pressure sensor on the tank below the membrane providing a second input to the logic circuit;

a scrubbing gas vent rate control valve on the scrubbing gas outlet controlled by a first output from the logic circuit to vent the scrubbing gas from the tank at a rate calculated to maintain a headspace gas pressure slightly below the pressure of the liquid in the tank;

whereby the machine can be attached to household plumbing without electrical connections to a water pump, and provides reduction of dissolved gasses from, and addition of said at least one desirable additive to, a household water supply.

8. The machine of claim 7, wherein the scrubbing gas pump has an electronically controllable pumping rate, and further comprising:

a contamination level sensor on the liquid outlet providing a third input to the logic circuit;

a scrubbing gas pump rate control output connected from the logic circuit to the scrubbing gas pump; and, wherein the logic circuit varies the rate of the scrubbing gas pump in proportion to the contamination level sensed at the liquid outlet.

* * * * *